United States Patent [19]

Mizuno et al.

[11] 4,261,229

[45] Apr. 14, 1981

[54] AUTOMATIC SPEED RATIO CONTROL SYSTEM FOR STEPLESS TRANSMISSION OF AUTOMOTIVE VEHICLES

[75] Inventors: Kiyofumi Mizuno, Nagoya; Hiroaki Maeda, Toyota; Shigeo Takahashi, Kariya; Masanori Sato; Satomi Suzuki, both of Nagoya, all of Japan

[73] Assignee: Aisin Seiki Kabushiki Kaisha, Kariya, Japan

[21] Appl. No.: 931,224

[22] Filed: Aug. 4, 1978

[30] Foreign Application Priority Data

Aug. 24, 1978 [JP] Japan ................. 53/101322

[51] Int. Cl.³ ..................... B60K 41/06; B60K 41/14; B60K 41/16
[52] U.S. Cl. ........................................ 74/866; 74/862; 74/867
[58] Field of Search ................. 74/866, 862, 861, 867

[56] References Cited

U.S. PATENT DOCUMENTS

| | | | |
|---|---|---|---|
| 3,237,398 | 3/1966 | Croswhite | 60/433 |
| 3,283,606 | 11/1966 | Brueder | 74/857 |
| 3,803,843 | 4/1974 | Nyman et al. | 60/445 |
| 3,898,893 | 8/1975 | Hashimoto et al. | 74/866 |
| 3,927,528 | 12/1975 | Kolk et al. | 74/861 X |
| 4,008,567 | 2/1977 | Hirsch | 74/866 |
| 4,039,061 | 8/1977 | Pruvot et al. | 74/866 |
| 4,082,013 | 4/1978 | Dornfeld et al. | 74/866 |
| 4,091,690 | 5/1978 | Miyao | 74/867 |
| 4,131,035 | 12/1978 | Mizuno et al. | 74/866 |
| 4,157,124 | 6/1979 | Poore | 74/866 X |

*Primary Examiner*—Leslie Braun
*Attorney, Agent, or Firm*—Sughrue, Rothwell, Mion, Zinn and Macpeak

[57] ABSTRACT

An automatic speed ratio control system of intergration servo mechanism type for a stepless transmission of an automotive vehicle. Speed ratio is controlled by a hydraulic pump motor of variable displacement type, which in turn is controlled by an actuator having a piston and a cylinder to which hydraulic oil is supplied. The system comprises a target value generator which produces a target value for an engine speed corresponding to a throttle opening or an output torque of an engine, or which produces a target value for an engine output torque corresponding to a throttle opening or an engine speed; a detector for producing a signal indicative of an engine speed or an output torque of an engine; a control signal generator for comparing the signal from the detector against the signal from the target value generator to produce a control signal in accordance with a deviation therebetween; and a controller responsive to the control signal to drive the actuator to change a speed ratio of the stepless transmission. The system is characterized by further comprising means for controlling a gain of the alteration rate of the speed ratio in response to the position of the actuator to increase the alteration rate when the actuator is at the position of low speed ratio and decrease the alteration rate when the actuator is at the position of high speed ratio.

6 Claims, 10 Drawing Figures

AUTOMATIC SPEED RATIO CONTROL SYSTEM FOR STEPLESS TRANSMISSION OF AUTOMOTIVE VEHICLES

BACKGROUND OF THE INVENTION

The invention relates to an automatic speed ratio control system which controls the speed of an stepless transmission of an automotive vehicle so that a given engine condition is achieved.

The output torque $T_E$ of an engine is related to the torque which is dissipated by the running of the vehicle as the following equation, assuming no torque loss:

$$T_E = (J \cdot \dot{n}_2 + A \cdot n_2^2 + B) \times e \qquad (1)$$

where "e" represents a speed ratio, "$n_2$" represents the rotational speed of an output shaft, $\dot{n}_2$ represents $dn_2/dt$, "J" represents the output inertia, "A" represents windage loss and "B" represents grade resistance. Since the speed ratio "e" presents the ratio of the rotational speed "$n_2$" of the output shaft to that "$n_1$" of the input shaft, we have $$n_2 = e \cdot n_1 \qquad (2)$$

Figures 6, 10:
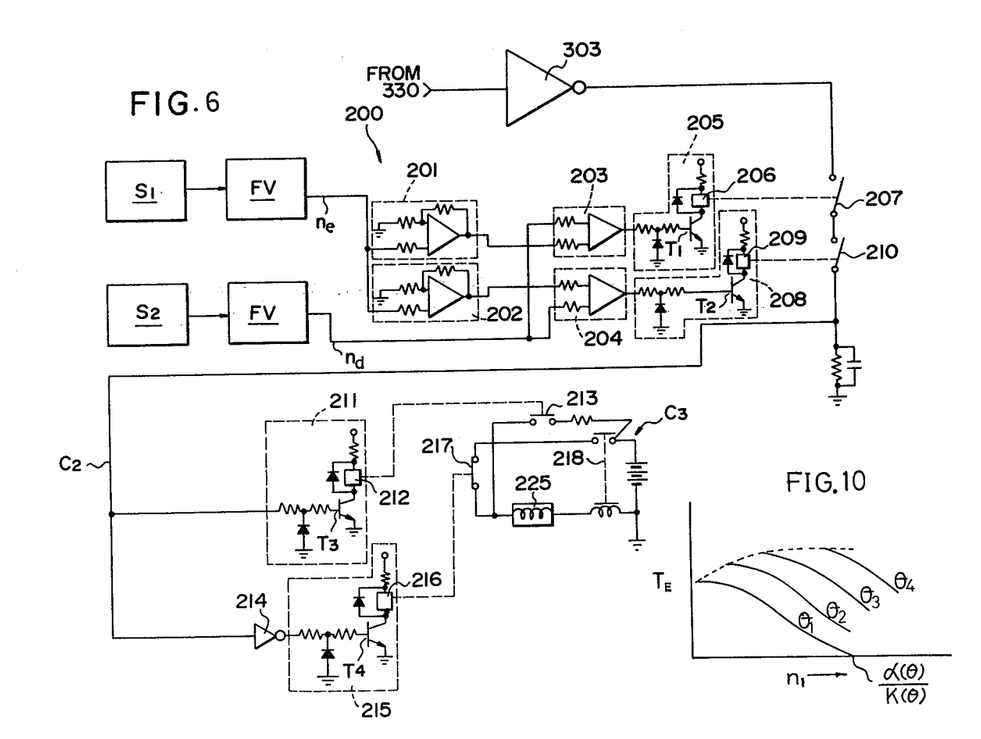
FIG. 6 is a schematic diagram of a clutch control circuit 200 shown in FIG. 3.
FIG. 10 graphically shows the relationship between the rotational engine speed $n_1$ and the output torque $T_E$ of the engine.

On the other side, the output torque $T_E$ of an internal combustion vehicle engine especially a gasoline engine has a characteristic as shown in FIG. 10 and is represented by the following equation (3):

$$T_E = -K(\theta) \cdot n_1 + \alpha(\theta) \qquad (3)$$

Accordingly, we have the following equation (3)'':

$$\dot{e} = \frac{1}{J \cdot n_1 \cdot e} [K(\theta) \cdot n_1 - \alpha(\theta) + J \cdot e^2 \cdot \dot{n}_1 + A \cdot n_2^2 \cdot e + B \cdot e] \qquad (3)'$$

$$= \frac{K(\theta)}{J \cdot n_1 \cdot e} \left[ n_1 - \frac{\alpha(\theta)}{K(\theta)} + \frac{J \cdot e^2}{K(\theta)} \cdot \dot{n}_1 + \frac{A \cdot e}{K(\theta)} \cdot n_2^2 + \frac{B}{K(\theta)} \cdot e \right] \qquad (3)''$$

Prior to the invention, the speed ratio e was controlled on the basis of the following equation (4):

$$\dot{e} = K_1 \cdot (n_1 - n_o) \qquad (4)$$

wherein "$n_o$" represents a target speed of the engine and "$K_1$" represents a gain constant.

Comparing the equations (4) and (3)'', we can understand that $$\left[ \frac{\alpha(\theta) - J \cdot e^2 \cdot \dot{n}_1 + A \cdot e \cdot n_2^2 + B \cdot e}{K(\theta)} \right]$$

of the equation (3)'' is represented by "$n_o$" of the equation (4), and $$\frac{K(\theta)}{J \cdot n_1 \cdot e}$$

of the equation (3)'' is represented by the gain constant "$K_1$" of the equation (4). The gain constant "$K_1$" is so determined as to fit with the normal running condition of the automotive vehicle. A prior system for controlling the speed ratio e on the basis of the equation (4) was disclosed in U.S. Pat. No. 3,803,843,. However, the system may cause an abrupt acceleration of the engine beyond the target speed at the starting ($n_2 \approx 0$) of the automotive vehicle when the vehicle has a wide range of "$n_2$" and thus the variation range of the speed ratio "e" is wide. Because the alteration rate "$\dot{e}$" is not enough to increase the speed ratio "e" to transmit the output torque $T_E$ to the output shaft of the stepless transmission sufficiently. The insufficient speed ratio "e" at the starting may provide a driver with an unpleasant feeling and cause a fall of an acceleration ability of the automotive vehicle.

In another systems such as disclosed in U.S. Pat. No. 3,237,398, the alteration rate "$\dot{e}$" is controlled in response to the throttle opening "$\theta$" on the basis of the following equation (5);

$$\dot{e} = a \cdot \theta \qquad (5)$$

However, the increase of the output torque $T_E$ of the engine may delay from the alteration of the throttle opening "$\theta$". Thus the alteration rate "$\dot{e}$" may lead the increase of the output torque $T_E$. U.S. Pat. No. 3,283,606 discloses a speed ratio control system having a slide valve member 34 and a fluid-flow retarding device 39 for controlling an actuator. The resistance of the fluid-flow retarding device 39 is adjusted as a function of a pump disc inclination which is controlled by the actuator. Thus the alteration rate of the speed ratio is controlled to increase and decrease when the speed ratio is low and high respectively.

SUMMARY OF THE INVENTION

According to the invention, the automatic speed ratio control system is provided, in order to improve the abrupt acceleration of the engine and the acceleration ability of the automotive vehicle at the starting, with a means for controlling the gain constant ($K_1$) of the alteration rate "$\dot{e}$" in response to the position of the speed ratio control actuator to increase the alteration rate when the speed ratio is low and decrease the alteration rate when the speed ratio is high.

A preferred control system of the invention comprises a target engine speed signal generator including a potentiometer which is adapted to move with the throttle valve in the engine, a function conversion circuit and a first-order lag circuit; an engine speed detector including a first speed sensor which generates a train of pulses, frequency of which corresponds to the rotational speed of the engine, and a first frequency-potential converter; an output shaft speed detector including a second speed sensor which generates a train of pulses, frequency of which corresponds to the rotational speed of the output shaft of the transmission, and a second frequency-potential converter; a control signal generator circuit including an adder-subtractor circuit which generates a deviation signal indicating the difference between the target engine speed and the actual engine speed, a polarity inversion circuit inverting the polarity of the output of the adder-subtractor selectively in response to the position of a manual shift valve and the operation of the high range and low range clutches of the transmission; a gain adjusting circuit including operational elements and a potentiometer which is adopted to move with the piston of the actuator to adjust the gain of the deviation signal in response to the position of the piston of the actuator; and a controller circuit including a servo amplifier and a servo valve having a control solenoid for controlling the direction and the flow rate of the pressure oil to the actuator. The potentiometer in the gain adjusting circuit is connected with an operational element in the gain adjusting circuit to increase the gain of the deviation signal when the piston of the actuator is at the low speed ratio position and decrease the gain when the piston is at the high speed ratio position.

DESCRIPTION OF A PREFERRED EMBODIMENT

Figure 1:
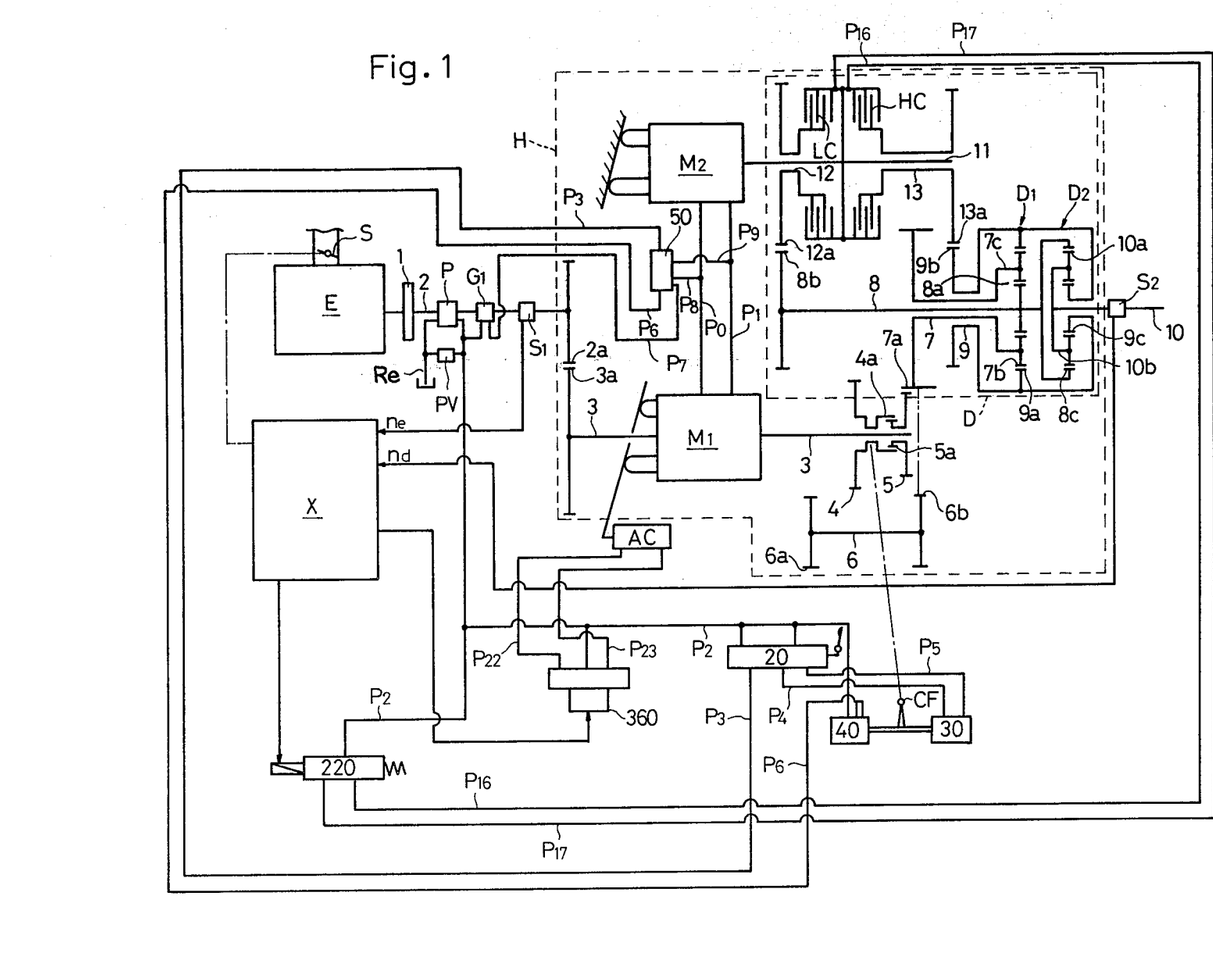
FIG. 1 is a schematic diagram illustrating the general arrangement of one embodiment of the invention.

Referring to FIG. 1, an engine E is connected through a flywheel 1 to an input shaft 2 of a hydro-mechanical transmission H. Connected with the input shaft 2 is a hydraulic pump P which cooperates with a relief valve PV to supply a given line pressure to an oil path $P_2$. Also connected with the input shaft 2 is a governor valve $G_1$ which adjusts the line pressure to a value which depends on the rotational speed of the engine E for supply to an oil path $P_7$. A gear 2a is fixedly mounted on the right-hand end of the input shaft 2, and meshes with a gear 3a fixedly mounted on the rotary shaft 3 of a first hydraulic pump motor $M_1$ of variable displacement type. A gear 4 is splined to the shaft 3 so as to be slidable axially and carries on its right-hand end a dog gear 4a, which can be driven in the lateral direction by a forward reverse shifting fork CF. In its right-hand position, the dog gear 4a can mesh with a dog gear 5a on a gear 5 which is rotatably mounted on the shaft 3. In its right-hand end position, it meshes with a left-hand gear 6a on a reverse shaft 6. The gear 5 and a right-hand gear 6b on the reverse shaft 6 are maintained in meshing engagement with a gear 7a on an intermediate shaft 7 which forms part of a differential gearing D. The differential gearing D includes a first epicyclic gearing $D_1$ and a second epicyclic gearing $D_2$. The first epicyclic gearing $D_1$ includes a sun gear 8a which is fixedly mounted on a first reaction shaft 8, on the left-hand end of which is fixedly mounted a gear 8b which meshes with an output gear 12a of a low range clutch LC. A ring gear 8c of the second epicyclic gearing $D_2$ is fixedly mounted on the right-hand end of the first reaction shaft 8. The first epicyclic gearing $D_1$ also includes a ring gear 9a which is fixedly mounted on a second reaction shaft 9 which is in turn rotatably mounted on the intermediate shaft 7. A gear 9b is fixedly mounted on the left-hand end of the second reaction shaft 9 and meshes with an output gear 13a of a high range clutch HC. A sun gear 9c of the second epicyclic gearing $D_2$ is fixedly mounted on the right-hand end of the second reaction shaft 9. The first epicyclic gearing $D_1$ also includes a planet gear 7b rotatably mounted on a carrier 7c which is located on the right-hand end of the intermediate shaft 7 which is in turn rotatably mounted on the first reaction shaft 8. The second epicyclic gearing $D_2$ includes a planet gear 10a which is rotatably mounted on a carrier 10b located on the left-hand end of an output shaft 10. A second hydraulic pump motor $M_2$ of a fixed displacement type is connected with the first pump motor $M_1$ through oil paths $P_o$ and $P_1$ and includes a rotary shaft 11 on which the low range and the high range clutch LC, HC are mounted. The low range clutch LC has an output shaft 12 which is rotatably mounted on the rotary shaft 11 and which rotates integrally therewith in response to the line pressure of an oil path $P_{17}$. Similarly, the high range clutch HC has an output shaft 13 which is rotatably mounted on the rotary shaft 11 and which rotates integrally therewith in response to the line pressure of an oil path $P_{16}$.

Figure 2:
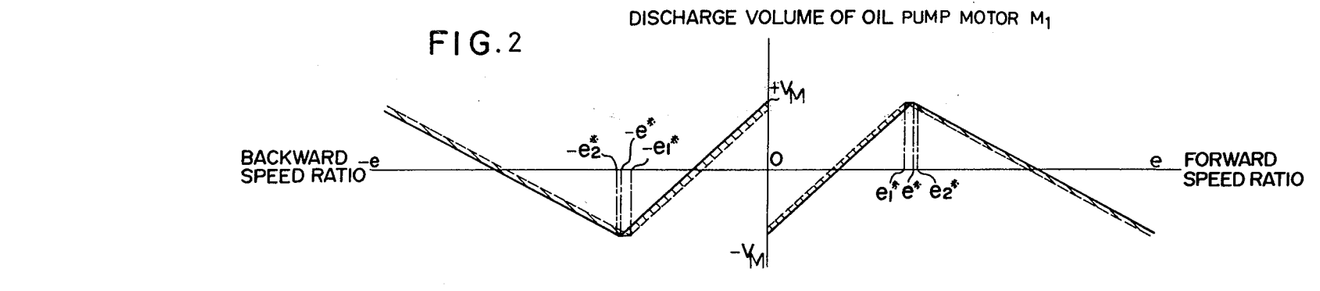
FIG. 2 graphically shows the relationship between the speed ratio of hydro-mechanical transmission and the discharge volume of a first hydraulic pump motor.

With the hydro-mechanical transmission H, when the dog gears 4a, 5a are brought into meshing engagement with each other and either low range or high range clutch LC or HC is actuated, the output shaft 10 can be rotated in the same direction as the input shaft 2. Conversely, when the gears 4, 6a are brought into meshing engagement with each other, the actuation of either clutch LC or HC rotates the output shaft 10 in the opposite direction from the input shaft 2. The meshing engagement between the dog gears 4a, 5a combined with the actuation of the low range clutch LC represents a status of transmission in the low speed ratio region in the forward direction while the meshing engagement between the dog gears 4a, 5a combined with the actuation of the high range clutch HC represents a status of transmission in the high speed ratio region in the forward direction. Conversely, the meshing engagement between the gears 4 and 6a achieves a status of a transmission in the low speed ratio region when the low range clutch LC is actuated, and in the high speed ratio region when the high range clutch HC is actuated, both in the reverse direction. The relationship between the discharge volume V of the first hydraulic pump motor $M_1$ and the forward speed ratio "e" or reverse speed ratio "−e" is illustrated in FIG. 2 by a shaded band, considering the oil leakage within the motors $M_1$, $M_2$. The solid line in FIG. 2 represents the relationship which results when the oil leakage is null. By contrast, the broken lines correspond to a maximum oil leakage.

A control system for the hydro-mechanical transmission H will now be described. A manual shift valve 20 shown in the lower right-hand portion of FIG. 1 controls a communication between oil paths $P_3$, $P_4$, $P_5$ on one hand and oil path $P_2$ and reservoir Re on the other, and has three positions, namely a neutral, a forward and a reverse position. In its forward position, valve 20 disconnects path $P_3$ from reservoir Re and connects it with path $P_2$, and also disconnects both paths $P_4$, $P_5$ from either path $P_2$ or reservoir Re. In the forward position, the valve disconnects path $P_3$ from path $P_2$ and connect the former with reservoir Re, and connects paths $P_4$ and $P_5$ with path $P_2$ and reservoir Re, respectively. In the reverse position, the valve disconnects path $P_3$ from path $P_2$ and connects the former with reservoir Re, and also connects paths $P_4$ and $P_5$ with reservoir Re and path $P_2$, respectively.

An actuator 30 is connected with paths $P_4$ and $P_5$ for shifting the forward/reverse shifting fork CF in the lateral direction. When the valve 20 shifts to its forward position to supply the line pressure to path $P_4$, the actuator 30 responds thereto by moving the gear 4 to its right-hand end position through the fork CF, thus bringing the dog gear 4a into meshing engagement with dog gear 5a. When the valve 20 shifts to the reverse position to supply the line pressure to path $P_5$, the actuator 30 brings the gear 4 to its left-hand end position through fork CF, thus causing it to mesh with gear 6a. A valve 40 mounted on the left-hand end of fork CF provides a temporary communication between paths $P_6$ and $P_2$ during the stroke of the gear 4 between its end positions.

A bypass clutch valve 50 is connected with paths $P_3$, $P_6$ and $P_7$ for enabling or disabling a communication between path $P_8$ connected with path $P_o$ and path $P_9$ connected with path $P_1$. In the neutral position of the valve 20 when the line pressure is supplied to path $P_3$, a communication is established between paths $P_8$ and $P_9$ to establish a neutral condition of the transmission H. A communication between paths $P_8$ and $P_9$ is also established during the idling of the engine E and when the line pressure is not supplied to path $P_6$. However, when the line pressure is supplied to path $P_6$, the communication between paths $P_8$ and $P_9$ is interrupted. The communication between these paths is also interrupted when no line pressure is supplied to path $P_3$ and the rotational speed of the engine E is higher than the idling speed.

The detailed construction of manual shift valve 20, actuator 30, valve 40 and bypass clutch valve 50 is described in U.S. patent application Ser. No. 764,532, filed Feb. 1, 1977, now abandoned, and continuation application Ser. No. 82,225 filed Oct. 4, 1979, both commonly assigned herewith. U.S. patent application Ser. No. 764,532, filed Feb. 1, 1977.

The discharge volume V of the first hydraulic pump motor $M_1$ is controlled by an actuator AC, and the actuation of clutch LC and HC is controlled by a solenoid valve 220. The position of a piston of the actuator AC is controlled by a pressure oil from a servo valve 360. The solenoid valve 220 and servo valve 360 are controlled by an electric control circuit X. Speed sensors $S_1$ and $S_2$ are adapted with input shaft 2 and output shaft 10 of the transmission H.

Figure 3:
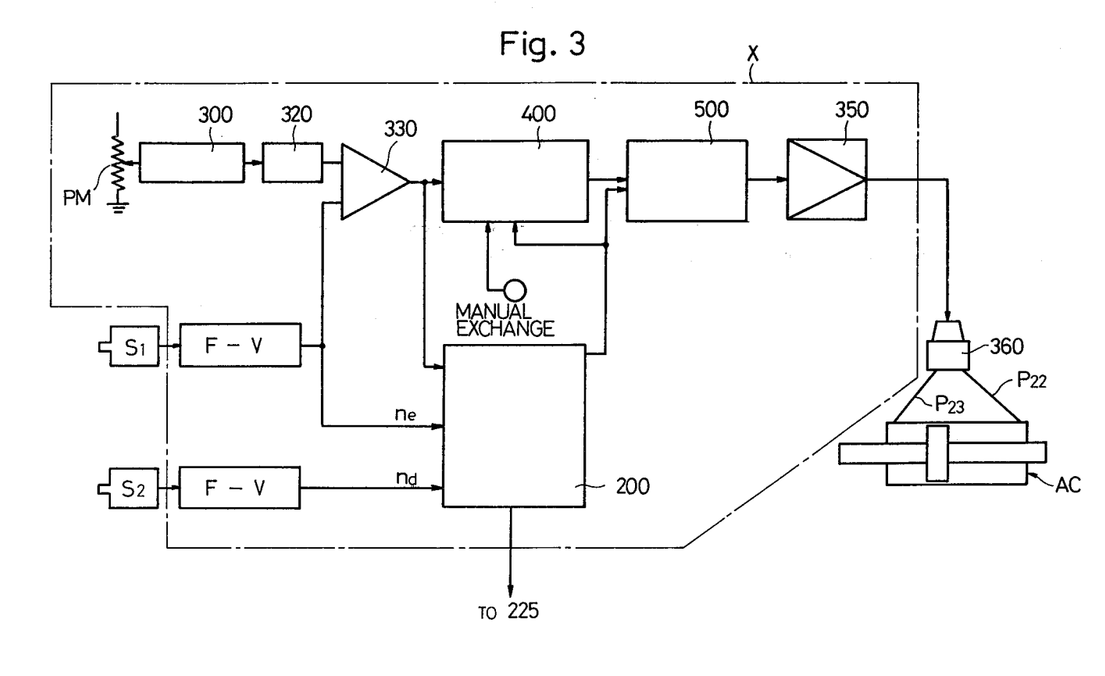
FIG. 3 is a block diagram of an electric control system X shown in FIG. 1.
Figure 4:
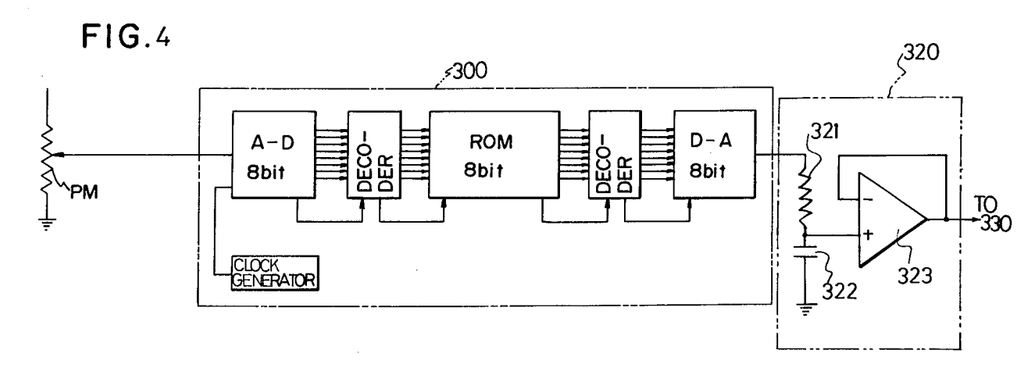
FIG. 4 is a block diagram of a function conversion circuit shown in FIG. 3.

An electrical control of the supply of the hydraulic pressure to the actuator AC as well as the low and the high range clutch LC, HC by the electric circuit X will now be described. Referring to FIG. 3, there is shown a potentiometer PM which is adapted to move with an engine throttle S. The potentiometer PM will provide a positive output potential which is reverse proportional to the throttle opening. The output of potentiometer PM is fed to a function conversion circuit 300, the detail of which is shown in FIG. 4. Referring to FIG. 4, it comprises an analog-digital converter A-D, a read only memory ROM, and a digital-analog converter D-A. The purpose of the function conversion circuit 300 is to produce a positive potential indicative of a target value of the engine speed which corresponds to a throttle opening. As shown in FIG. 4, the output of the circuit 300 is fed to a first-order lag circuit or primary delay circuit 320, which comprises resistor 321, capacitor 322 and impedance converting, operational element 323. Thence it is supplied to a positive input of an adder-subtractor 330. The adder-subtractor 330 has a negative input which is fed with a positive potential "$n_e$" responsive to the engine speed and which is formed by the combination of sensor $S_1$ mounted on the input shaft 2 and sensing the number of revolutions thereof and a frequency-potential converter F-V. When the engine speed coincides with its target value, the positive potential "$n_e$" also coincides with the positive output potential of the function conversion circuit 300. It is to be understand that the relationship between the throttle opening and the target value of the engine speed, which has been mentioned previously, also applies in this instance.

The output of the adder-subtractor 330 is fed through a polarity inversion circuit 400, a gain adjusting circuit 500 and a servo amplifier 350, in sequence, to a servo valve 360. When the output potential from servo amplifier 350 is null, the servo valve 360 disconnects both oil paths $P_{22}$ and $P_{23}$ of the actuator AC from oil path $P_2$ and reservoir Re. When the output potential from servo amplifier 350 is positive, it provides a communication between oil paths $P_{23}$ and $P_{22}$ and oil path $P_2$ and reservoir Re, respectively. The degree of communication therebetween is controlled in accordance with the magnitude of the positive potential fed from servo amplifier 350. If the output from servo amplifier 350 is negative, oil paths $P_{22}$ and $P_{23}$ communicate with oil path $P_2$ and reservoir Re, respectively, with the degree of communication being controlled in accordance with the magnitude of the negative potential.

Figure 5:
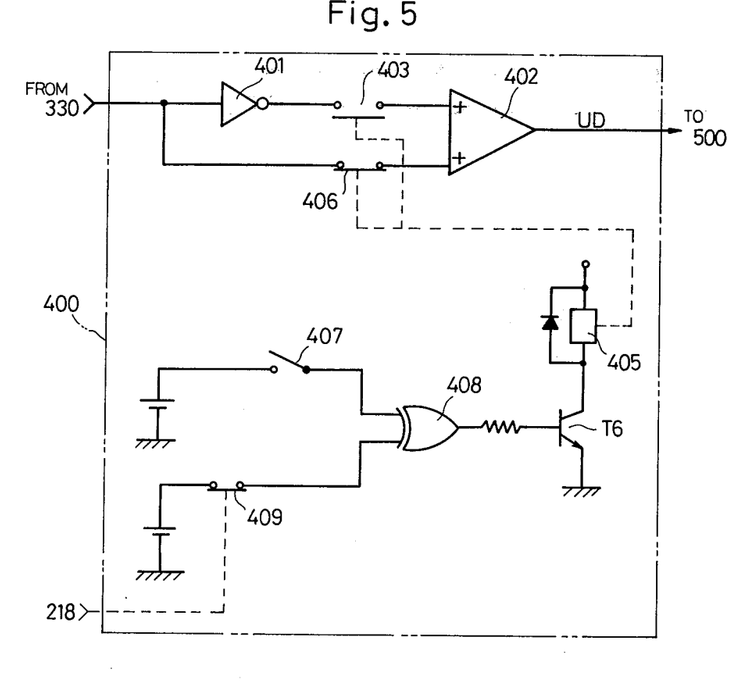
FIG. 5 is a circuit diagram of a polarity inversion circuit 400 shown in FIG. 3.

Referring to FIG. 5, the polarity inversion circuit 400 is shown as comprising an inverter 401 connected to receive the output of the adder-subtractor 330, a normally open switch 403 which is closed by a reed relay 405 to connect the inverter output to an adder 402, and a normally closed contact 406 which opens in response to the energization of a reed relay 405 and passes the output from the adder-subtractor 330 to the adder 402. The reed relay 405 is energized when transistor $T_6$ conducts. It will be seen that transistor $T_6$ is rendered conductive by an exclusive OR circuit 408 when either of switch 407 and normally closed contact 409 is closed. The switch 407 is closed only when the manual shift valve 20 is in its forward position. The normally closed contact 409 is opened in ganged relationship with the solenoid-operated switch 218 in clutch control circuit 200 shown in FIG. 6 during the actuation of the high range clutch HC. In the circuit 400, when the valve 20 is in its forward position and the low range clutch LC is actuated, or when the valve 20 is in its reverse position and the high range clutch HC is actuated, transistor $T_6$ is OFF state and reed relay 405 is deenergized, so that normally closed contact 406 is closed and normally open contact 43 is open. Thus the output from the adder-subtractor 330 is directly applied to gain adjusting circuit 500. When the valve 20 is in its forward position and the high range clutch HC is actuated, or when the valve 20 is in its reverse position and the low range clutch LC is actuated, transistor $T_6$ turns ON and normally open contact 403 closes whereas normally closed contact 406 opens, so that the output from the adder-subtractor 330 is applied to gain adjusting circuit 500 after its polarity is reversed. Input terminals of adder 402 and exclusive OR circuit 408 are respectively connected to ground when they are disconnected from the input signal lines (contacts 403, 406, 407 and 409) of them.

The clutch control circuit 200 controls a solenoid valve 220, which is normally spring biased to a first position in which oil path $P_{17}$ communicates with oil path $P_2$ and oil path $P_{16}$ communicates with reservoir Re. However, when an associated solenoid 225 is energized, the valve 220 assumes another position in which oil path $P_{16}$ communicates with oil path $P_2$ and oil path $P_{17}$ communicates with reservoir Re. The circuit 200 comprises a multiplier 201 which produces a product of the positive potential "$n_e$" (corresponding to the rotation of the input shaft 2) and a speed ratio "$e_2*$"; another multiplier 202 which produces a product of the positive potential "$n_e$" and a speed ratio "$e_1*$"; a comparator 203 which compares a positive output potential $n_e \cdot e_2*$ from the multiplier 201 against a positive output potential $n_d$ from speed sensor $S_2$ mounted on the output shaft 10; and another comparator 204 which compares the positive output potential $n_e \cdot e_1*$ from the multiplier 202 against the positive output potential "$n_d$" from the sensor $S_2$. When the comparator 203 determines that the product $n_e \cdot e_2*$ is greater than "$n_d$", a positive output is applied to transistor $T_1$ in a relay drive circuit 205. When the comparator 204 determines that "$n_d$" is greater than the product $n_e \cdot e_1*$, a positive output is applied to transistor $T_2$ in a relay drive circuit 208. When the positive output is applied to transistor $T_1$, a reed relay 206 is energized to close a normally open contact 207. When the positive output is applied to transistor $T_2$, a reed relay 209 is energized to close a normally open contact 210. If both transistors $T_1$, $T_2$ are rendered conductive to close the both contacts 207, 210, a circuit $C_2$ is closed which interconnects a driver $C_3$ for the solenoid valve 220 and the adder-subtractor 330. As a consequence, when the adder-subtractor 330 produces a negative potential, it is passed through an inverter 303, whereby a positive potential is applied to circuit $C_2$ to forward bias transistor $T_3$ in a relay drive circuit 211, thus energizing a reed relay 212 to close a normally open contact 213. When the adder-subtractor 330 produces a positive potential, it is inverted by the element 303 to apply a negative potential to the circuit $C_2$. The negative output is passed through an inverter 214 to be applied to forward bias transistor $T_4$ in a relay drive circuit 215. Thereupon a reed relay 216 is energized to open a normally closed contact 217. Stated differently, the clutch control circuit 200 operates in a manner such that when the speed ratio "e" is within a range defined by "$e_1*$" and "$e_2*$", the both normally open contacts 207, 210 are closed, and if the adder-subtractor 330 produces a negative potential, the normally open contact 213 in the drive circuit $C_3$ is closed to energize a solenoid 225 associated with the solenoid valve 220, a self-holding circuit being completed for the solenoid through the solenoid-operated switch 218. If the adder-subtractor 330 produces a positive potential, the normally closed contact 217 in the drive circuit $C_3$ is opened to deenergize the solenoid 225, whereupon the switch 218 is also opened.

Figure 7:
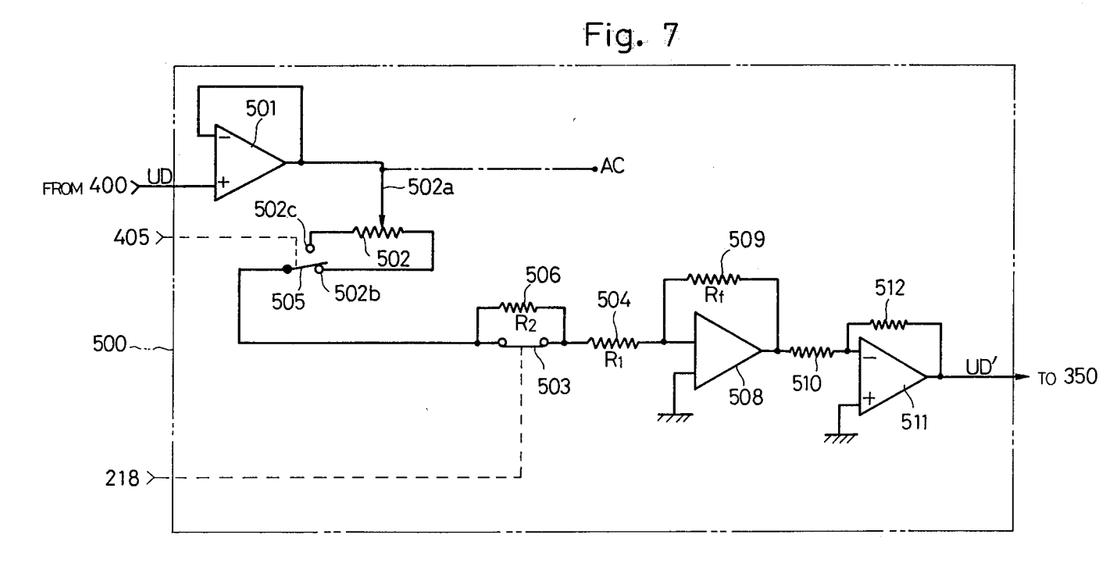
FIG. 7 is a circuit diagram of a gain adjusting circuit 500 shown in FIG. 3.

The gain adjusting circuit 500 is a main part of the invention. The construction and operation of gain adjusting circuit is described hereinafter.

Referring to FIG. 7, the output UD of polarity inversion circuit 400 is fed to an operational amplifier or operational element 501, output potential of which is fed to a slider 502$a$ of a potentiometer 502. Slider 502$a$ of potentiometer 502 is linked with the piston of actuator AC. When the piston of actuator AC is at the position at which the discharge volume V of the first hydraulic pump motor $M_1$ is $-V_M$, the slider 502$a$ is at outermost right side position near the terminal 502$b$ of potentiometer 502. When the piston of actuator AC is at the position at which the discharge volume V of the first hydraulic pump motor $M_1$ is $+V_M$, the slider 502$a$ is at outermost left side position near the terminal 502$c$ of potentiometer 502. A contact 505 is connected with a resistor 506, and operated by reed relay 405 of polarity inversion circuit 400. The contact 505 touches the terminal 502$c$ when the reed relay 405 is energized. Deenergizing the reed relay 405, the contact 505 touches the terminal 502$b$. A normally closed switch contact 503, which shunts the resistor 506, is opened by the solenoid operated switch 218 of the clutch control circuit 200. At open state of the contact 503, open terminals which are connected with the resistor 506 are not connected to the ground. A resistor 504 is connected between resistor 506 and a negative input terminal of an operational element 508. The output potential of operational element 508 is fed back to the negative input terminal through a resistor 509. The output potential of operational element 508 is supplied to a negative input terminal of an operational element 511 through a resistor 510. The output potential UD' of operational element 511 is supplied to servo amplifier 350 and the negative input terminal of operational element 511 through a resistor 512.

In operation, when the engine E is at rest, the solenoid 225 is not energized, and hence the solenoid valve 220 provides a communication between oil paths $P_{17}$ and $P_{16}$ and oil path $P_2$ and reservoir Re, respectively. When the manual shift valve 20 shown in FIG. 1 is brought to its neutral position in order to start the engine E, the hydraulic pump P operates to supply the line pressure to oil path $P_2$ and thence through the solenoid valve 220 to oil path $P_{17}$, whereby the low range clutch LC is actuated. Subsequently when the manual shift valve 20 is shifted to its forward position in order to run the vehicle in the forward direction, the polarity inversion circuit 400 applies the output from the adder-subtractor 330 directly to the gain adjusting circuit 500. The normally closed contact 503 in the gain adjusting circuit 500 is closed state since the solenoid-operated switch 218 is open. The contact 505 touches the terminal 502$b$ of potentiometer 502. Since the positive potential supplied from the function conversion circuit 300 through the primary delay circuit 320 is higher than the positive potential "$n_e$" supplied from the sensor $S_1$, the adder-subtractor 330 now supplies a positive output potential which corresponds to the difference therebetween to gain adjusting circuit 500 through polarity inversion circuit 400. The output potential supplied to the positive terminal of operational element 501 is fed to operational element 508 through operational element 501, slider 502$a$, potentiometer 502, terminal 502$b$, contacts 505, 503 and resistor 504 in serial. Then the positive potential is inverted and amplified by the operational element 508 and supplied to operational element 511 through resistor 510. The operational element 511 inverts and amplifies the output potential from the operational element 508. The output potential of the operational element 511 is applied to servo amplifier 350. Consequently, a positive potential is applied to the servo valve 360 until the accelerator pedal is depressed, whereby the servo valve 360 provides a communication between oil paths $P_{23}$ and $P_{22}$ and oil path $P_2$ and reservoir Re, respectively. As a result, the actuator AC responds to the line pressure supplied from oil path $P_2$ to oil path $P_{23}$ by changing the discharge volume of the first hydraulic pump motor $M_1$ to $-V_M$ and reducing the speed ratio "e" to null. The slider 502a of potentiometer 502 in the gain adjusting circuit 500 is the outermost right side position near the terminal 502b.

When the accelerator pedal is depressed to increase the throttle opening, an increase in the throttle opening causes a positive output potential from the potentiometer PM to reduce to a value which depends on the magnitude of such opening. In response thereto, the function conversion circuit 300 produces an increased positive output, and also the primary delay circuit 320 progressively increases the positive input to the adder-subtractor 330. Also the negative input to the adder-subtractor 330 progressively increases in response to the increase of the rotational speed of output shaft 10. In response thereto, the positive output from the adder-subtractor 330 decreases progressively. When the negative input to adder-subtractor 330 exceeds the positive input, the output from adder-subtractor 330 becomes a negative voltage which corresponds to the difference between the positive and negative inputs to adder-subtractor 330. The negative output voltage from adder-subtractor 330 is applied to servo amplifier 350 through polarity inversion circuit 400 and gain adjusting circuit 500, by which servo valve 360 communicates oil paths $P_{22}$ and $P_2$ to oil path $P_{23}$ and reservoir Re respectively. At this time, bypass clutch valve 50 have interrupted the communication between oil paths $P_8$ and $P_9$. Therefore the actuator AC causes the discharge volume of the first hydraulic pump motor $M_1$ to initiate its change toward $+V_M$, thus starting the vehicle. The speed ratio "e" rises until the output potential of adder-subtractor 330 becomes null. Slider 502a of potentiometer 502 moves toward left in response to the elevation of the speed ratio (i.e. movement of the piston of the actuator AC). When the output of adder-subtractor 330 is still negative after the speed ratio "e" reaches the speed ratio "$e_1$*", normally open contact 213 of clutch control circuit 200 is closed. Then solenoid 225 of solenoid valve 220 is energized to communicate oil path $P_{16}$ to oil path $P_2$ and oil path $P_{17}$ to reservoir Re. Thus high range clutch HC is operated and low range clutch is unoperated. At the same time, polarity inversion circuit 400 becomes to supply inverted output of the inverter 401 to adder 402, normally closed contact 503 opens, and contact 505 touches the terminal 502c of potentiometer 502 by the energization of reed relay 405 of polarity inversion circuit 400. Then output negative potential of adder-subtractor circuit 330 is inverted by polarity inversion circuit 400 and supplied to gain adjusting circuit 500. The output positive potential supplied to the positive terminal of operational element 501 is fed to operational element 508 through slider 502a, potentiometer 502, terminal 502c and resistors 506, 504 in serial. Then the positive potential is inverted and amplified by the operational element 508 and supplied to operational element 511 through resistor 510. The operational element 511 inverts and amplified the output potential from operational element 511. The output potential of the operational element 511 is applied to servo amplifier 350. Consequently a positive potential is applied to the servo valve 360, whereby the servo valve 360 provides a communication between oil parts $P_{22}$ and $P_{23}$ and oil path $P_2$ and reservoir Re, respectively. As a result, the actuator AC responds to the line pressure from oil path $P_2$ to oil path $P_{22}$ by changing the discharge volume V of the first hydraulic pump motor $M_1$ to $+V_M$ and increasing the speed ratio "e". The slider 502a of potentiometer 502 in the gain adjusting circuit 500 moves toward right in response to the elevation of the speed ratio "e". The normally open contact 213 of clutch control circuit 200 will open after the speed ratio "e" exceed the predetermined value "$e_2$*". However, the solenoid 225 remains energized because the solenoid-operated switch 218 is closed.

When the throttle opening is reduced during the speed ratio "e" exceed the predetermined value "$e_2$*", an decrease in the throttle opening causes a positive output potential from the potentiometer PM to increase to a value which depends on the magnitude of such opening. In response thereto, the output positive potential of the function conversion circuit 300 reduces, and the primary delay circuit 320 progressively decreases the positive input to the adder-subtractor 330. In response thereto, the output potential of adder-subtractor 330 becomes negative, and a positive potential is applied to the servo amplifier 350. Thus the speed ratio "e" increases. The rotational speed of the engine becomes low in response to the increase of the speed ratio "e", whereby the input negative potential of adder-substractor 330 decreases. As a result, the output negative potential progressively decreases. When the input negative potential becomes smaller than the input positive potential, the output potential of the adder-substractor 330 turns to positive potential, whereby a negative potential is applied to servo amplifier 350 and the speed ratio "e" decreases. The slider 502a of potentiometer 502 moves toward left. The speed ratio "e" decreases until the output potential of the adder-substractor 330 becomes null. When the output of the adder-subtractor 330 is still positive after the speed ratio "e" reaches to the predetermined value "$e_2$*", the normally closed contact 217 is opened and the solenoid of the solenoid valve 220 is deenergized. Thus the solenoid valve 220 communicates oil path $P_{17}$ to oil path $P_2$ to operates the low range clutch LC, and oil path $P_{16}$ to reservoir Re to unoperate the high range clutch HC. At the same time, the polarity inversion circuit 400 supplies the output of adder-subtractor 330 directly to the gain adjusting circuit 500, in which the normally closed contact 503 is closed and the contact 505 touches the terminal 502b since the reed relay 405 of polarity inversion circuit 400 is not operated. As a result, a negative potential is applied to servo amplifier 350 in succession and the speed ratio "e" decreases. The slider 502a of the potentiometer 502 in the gain adjusting circuit 500 moves toward right in response to the decrease of the speed ratio "e".

When the manual shift valve 20 is operated to the backward running position during the speed ratio "e" is null, the line pressure of oil path $P_2$ is applied to the actuator 30 through oil path $P_5$. The actuator 30, in response to the line pressure of oil path $P_2$, operates so as to bring the gear 4 of the hydro-mechanical transmission H to its left-hand end position through fork CF, thus causing it to mesh with gear 6a. At the same time, the polarity inversion circuit 400 becomes to invert the output of the adder-subtractor 330 to the gain adjusting circuit 500. Since the output of adder-subtractor 330 is positive until the accelerator pedal is depressed, a negative potential is applied to servo amplifier 350. Thus the actuator AC determines the discharge volume V of the first hydraulic pump motor $M_1$ at $+V_M$, and the speed ratio "e" is null. The contact 505 of the gain adjusting circuit 500 touches the terminal 502c of potentiometer 502 under the operation of reed relay 405 of polarity inversion circuit 400. Since the normally closed contact 503 is closed, the output of adder-subtractor circuit 330 is applied to operational element 508 through slider 502a, terminal 502c, contact 505, normally closed contact 503 and resistor 504.

When the high range clutch LC is operated during the backward running position of the manual shift valve 20, the contact 505 touches the terminal 502b of potentiometer 502 because the reed relay 405 of the polarity inversion circuit 400 is not operated. The normally closed contact 503 opens by the operation of the solenoid-operated switch 218 of the clutch control circuit 200. As a result, the output of adder-subtractor 330 is applied to operational element 508 through slider 502a, terminal 502b, contact 505 and resistors 506, 504. As the case of forward running, the input resistance of the operational element 508 alters in response to the alteration of absolute value of the speed ratio "e". The operation which occurs after the starting is similar to that of the forward running position of the manual shift valve 20, and therefore will be apparent from the foregoing description.

In the speed control operation as described hereinbefore, the input resistance of operational element 508 of the gain adjusting circuit 500 is the sum $R_1 + R_b$ of the resistance $R_1$ of resistor 504 and the resistance $R_b$ between slider 502a and terminal 502b of potentiometer 502 during the hydro-mechanical transmission H operates in the forward, low speed ratio transmission mode. Assuming that the resistance of the feedback resistor 509 is $R_f$, the output Vot of operational element 503 is represented by the following equation:

$$Vot = -\left[\frac{R_f}{R_1 + R_b}\right] \cdot UD$$

The output UD' of the gain adjusting circuit 500 is represented by the following equation:

$$UD' = K_A \cdot \left[\frac{R_f}{R_1 + R_b}\right] \cdot UD$$

wherein "$K_A$" is the amplification rate of operational element 504, which is determined by the resistance of the feedback resistor 512 and the resistor 510.

Also the input resistance of operational element 508 of the gain adjusting circuit 500 is the sum $R_1 + R_c + R_2$ of the resistance $R_1$ of resistor 504, the resistance $R_c$ between slider 502a and terminal 502c of potentiometer 502 and the resistance $R_c$ of resistor 506 during the hydromechanical transmission H operates in the forward, high speed ratio transmission mode. The output Vot of operational element 503 and the output UD' of the gain adjusting circuit 500 are represented by the following equations:

$$Vot = -\left[\frac{R_f}{R_1 + R_a + R_c}\right] \cdot UD$$

$$UD' = K_A \cdot \left[\frac{R_f}{R_1 + R_2 + R_c}\right] \cdot UD$$

Further, the input resistance of operational element 508 is the sum $R_1 + R_c$ of the resistance $R_1$ of resistor 504 and the resistance $R_c$ between slider 502a and terminal 502c of potentiometer 502 during the hydromechanical transmission H operates in the backward, low speed ratio transmission mode. The output Vot and the output UD' are represented by the following equations:

$$Vot = -\left[\frac{R_f}{R_1 + R_c}\right] \cdot UD$$

$$UD' = K_A \cdot \left[\frac{R_f}{R_1 + R_c}\right] \cdot UD$$

Furthermore, the input resistance of operational element 508 is the sum $R_1 + R_a + R_b$ of the resistance $R_1$ of resistor 504, the resistance $R_b$ between slider 502a and terminal 502b of potentiometer 502 and the resistance $R_2$ of resistor 506 during the hydro-mechanical transmission H operates the forward, high speed ratio transmission mode. The output Vot of operational element 503 and the output UD' of the gain adjusting circuit 500 are represented by the following equations:

$$Vot = -\left[\frac{R_f}{R_1 + R_a + R_b}\right] \cdot UD$$

$$UD' = K_A \cdot \left[\frac{R_f}{R_1 + R_2 + R_b}\right] \cdot UD.$$

Figure 8:
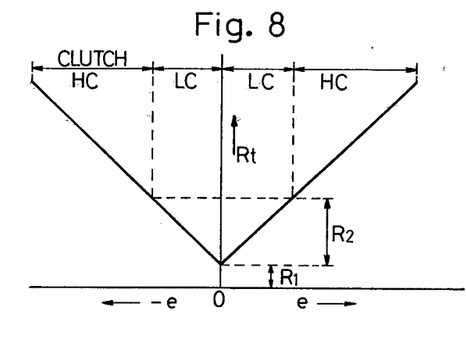
FIG. 8 graphically shows the relationship between the speed ratio e and the input resistance $R_i$ of an operational element 508 in the gain adjusting circuit 500.
Figure 9:
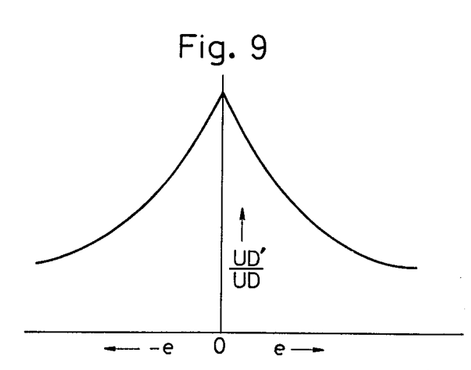
FIG. 9 graphically shows the relationship between the speed ratio e and the gain $UD'/UD$ of the gain adjusting circuit.

The resistance $R_b$ is the minimum value when the discharge volume V of the first hydraulic pump motor $M_1$ is $-V_M$, and the maximum value when the discharge volume V is $+V_M$. However, the resistance $R_c$ is the maximum value when the discharge volume V is $-V_M$, and the minimum value when the discharge volume V is $+V_M$. The maximum value of the resistance $R_b$ is equal with the sum of the minimum value of the resistance $R_c$ and the resistance $R_2$. Therefore the input resistance $R_t$ of operational element 508 alters as shown in FIG. 8 in response to the alteration of the speed ratio "e", and the ratio UD'/UD alters as shown in FIG. 9 in response to the alteration of the speed ratio "e". The alteration of the ratio UD'/UD means that the gain of the alteration rate "ë" of the speed ratio "e" alters. The gain of the alteration rate "ë" is high when the speed ratio "e" is small and low when the speed ratio "e" is high, whereby the abrupt acceleration of the engine is prevented without deteriorating the speed ratio control characteristic at the normal running speed.

In the embodiment described above, the engine speed corresponding to a throttle opening has been chosen as a controlled variable, but the invention is equally applicable if an engine output torque corresponding to a throttle opening, an engine speed corresponding to an engine output torque or an engine output torque corresponding to the number of rotation of an engine is chosen as a controlled variable.

It should also be understood that while the hydromechanical transmission has been utilized as a stepless transmission in the embodiment described above, any other form of stepless transmission may be used.

What is claimed is:

1. An automatic speed ratio control system for a stepless transmission of an automotive vehicle comprising:
    a target signal generator producing a target value signal for controlling operation of an engine on the automotive vehicle;
    a detector means for producing a signal indicative of operation of the engine;
    a compator means comparing the signal indicative of operation of the engine with the target value signal to produce a deviation signal indicative of the difference between the target value and the actual value indicative of the target and actual operation of the engine respectively;
    a clutch control circuit which controls the operation of a solenoid valve for controlling the operations of clutches;
    a polarity inversion circuit which inverts the polarity of the signal supplied out from the comparator means in response to an operation of the clutch control circuit;
    a servo amplifier which controls the operation of a servo valve in response to the output from the polarity inversion circuit;
    an actuator which controls the speed ratio of the transmission in response to the operation of the servo valve; and
    a gain adjusting circuit which is interposed between the comparator means and the servo amplifier to adjust a gain of the signal supplied to the servo amplifier in response to the operation of the actuator so as to increase the gain when the speed ratio is low and decrease the gain when the speed ratio is high.

2. An automatic speed ratio control system for a stepless transmission of an automotive vehicle as set forth in claim 1, wherein the gain adjusting circuit includes operational elements and a potentiometer linked with the actuator.

3. An automatic speed ratio control system for a stepless transmission of an automotive vehicle as set forth in claim 2, in which the potentiometer has a slider linked with the piston of the actuator and two terminals, the slider is connected with the output terminal of an operational element and the terminals are selectively connected to an input terminal of another operational element through a switch contact.

4. An automatic speed ratio control system for a stepless transmission of an automotive vehicle, having a target value signal generator means which produce a target value signal for controlling operation of an engine on the automotive vehicle, a detector means for producing a signal indicative of operation of the engine, a control signal generator means for comparing the signal from the detector means against the target value signal from the target value signal generator means to generate a deviation signal in accordance with a deviation therebetween, controller means responsive to the deviation signal from the control signal generator means to change a speed ratio of the stepless transmission, and means for controlling a gain of the deviation signal in response to the controller means to increase the alteration rate of the speed ratio when the speed ratio is low and decrease the alteration rate of the speed ratio when the speed ratio is high.

5. An automatic speed ratio control system for a stepless transmission of an automotive vehicle as set forth in claim 1 in which the target value signal generator means includes a potentiometer which is adapted to move with the throttle valve in the engine, a function conversion circuit and a first-order lag circuit; the detector means includes a speed sensor which generates a train of pulses, frequency of which corresponds to the rotational speed of the engine, and a frequency-potential converter; the control signal generator means includes an adder-subtractor circuit; the controller means includes a servo amplifier, a servo valve and an actuator having a piston; and the means for controlling the gain of the deviation signal is a gain adjusting circuit which is interposed between the adder-subtractor circuit and the servo amplifier and includes operational elements and a potentiometer linked with the piston of the actuator.

6. An automatic speed ratio control system for a stepless transmission of an automotive vehicle as set forth in claim 5 in which the potentiometer has a slider linked with the piston of the actuator and two terminals, the slider is connected with the output terminal of an operational element and the terminals are selectively connected to an input terminal of another operational element through a switch contact.

* * * * *